United States Patent
Agee et al.

(10) Patent No.: US 7,165,537 B2
(45) Date of Patent: Jan. 23, 2007

(54) CHARGE AIR COOLER

(75) Inventors: Keith D. Agee, Torrance, CA (US);
Richard P. Beldam, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 8 days.

(21) Appl. No.: 10/985,281

(22) Filed: Nov. 10, 2004

(65) Prior Publication Data

US 2006/0096286 A1    May 11, 2006

(51) Int. Cl.
*F02B 53/00* (2006.01)
*F02B 29/04* (2006.01)
*F28D 7/10* (2006.01)

(52) U.S. Cl. .................. 123/563; 60/599; 165/140; 165/157

(58) Field of Classification Search .......... 123/563; 60/599; 165/140, 157
See application file for complete search history.

(56) References Cited

U.S. PATENT DOCUMENTS

| | | | |
|---|---|---|---|
| 4,258,550 A * | 3/1981 | Hinkle et al. .................. 60/599 |
| 5,078,206 A * | 1/1992 | Goetz, Jr. .................... 165/140 |
| 5,875,837 A * | 3/1999 | Hughes ........................ 165/140 |
| 6,755,158 B2 | 6/2004 | Knecht et al. ............. 123/41.56 |
| 2003/0037917 A1 | 2/2003 | Emrich ......................... 165/151 |
| 2005/0006067 A1* | 1/2005 | Hoglinger et al. ........... 165/140 |
| 2005/0092470 A1* | 5/2005 | Heine ........................... 165/140 |
| 2005/0109493 A1* | 5/2005 | Wu et al. ..................... 165/157 |
| 2005/0133207 A1* | 6/2005 | Scoville et al. .............. 165/140 |

FOREIGN PATENT DOCUMENTS

| | | | |
|---|---|---|---|
| EP | 545842 A1 * | 6/1993 |
| GB | 2375388 A * | 11/2002 |
| JP | 57171027 A * | 10/1982 |
| JP | 61059188 A * | 3/1986 |
| SU | 1183697 A * | 10/1985 |

* cited by examiner

*Primary Examiner*—Thai-Ba Trieu
(74) *Attorney, Agent, or Firm*—Chris James

(57) ABSTRACT

A charge air cooler with an integral precooler is disclosed which cools charge air by using both liquid coolant and air coolant. The charge air path is not affected by the use of the liquid coolant. The charge air cooler disclosed can cool particularly hot charge air without a significant drop in pressure.

11 Claims, 6 Drawing Sheets

Alternative A: separate water tanks

Alternative A: separate water tanks

CHARGE AIR COOLER

BACKGROUND TO THE INVENTION

This invention relates to a charge air cooler for use in a turbocharging loop of an engine.

Turbochargers are frequently used in order to compress more air within engine cylinders to allow more efficient combustion with fuel, reducing wasteful emissions and increasing the power gained from each piston stroke. A consequence of compressing air is that its temperature increases which reduces the density of the charge air, increases nitrous oxide emissions and can lead to premature aging of the engine.

It is known to provide a charge air/air cooler between the turbocharger and engine cylinders in order to cool the compressed air and mitigate these problems. However, in order to meet increasingly strict emission regulations, charge air pressure must be significantly boosted (up to 4to 1) which results in a temperature increase to over 500 F (260° C.). This temperature increase results in the temperature of known charge-air coolers to increase beyond their operational design limit.

High thermal stresses are also created by the temperature difference between the cooling air and charge air. As a result, charge air cooler life is significantly reduced.

US Patent Application US20030037917A1 describes the use of a cooler utilizing liquid coolant which can be provided upstream of a conventional charge air/air cooler. However the radial dispersion of the charge air reduces the charge air pressure due to the change in direction of the charge air, resulting in a pressure loss and lower pressure boost. Moreover, the use of a separate cooler reduces the pressure of the charge air since the air must enter and exit two coolers, suffering pressure losses each time.

U.S. Pat. No. 6,755,158 also discloses a cooler which utilizes liquid coolant but suffers from the same disadvantage of pressure loss due to the provision of a separate cooler.

SUMMARY OF THE INVENTION

An object of the present invention is to provide a charge air cooler which can cope with high temperature charge air whilst minimizing pressure drop of the charge air.

According to a first aspect of the present invention, there is provided a charge air cooler comprising:
  a charge air inlet;
  a charge air outlet;
  a plurality of charge air conduits in communication with the charge air inlet and the charge air outlet;
  at least one liquid coolant passage;
  at least one air coolant passage;
  wherein a first portion of at least one charge air conduit is disposed adjacent to the liquid coolant passage and a second portion of said at least one charge air conduit is disposed adjacent to the air coolant passage.

Optionally the liquid coolant passage is a channel which extends to each of the charge air conduits. However, preferably a plurality of coolant passages are disposed between said charge air conduits and the liquid coolant passage is a portion of each coolant passage. Therefore a portion of each coolant passage is preferably gas coolant passages and a portion of each coolant passage is preferably a liquid coolant passage.

Preferably a first portion of each charge air conduit is disposed adjacent to at least one liquid coolant passage and a second portion of each charge air conduit is disposed adjacent to at least one air coolant passage.

Preferably the charge air conduits extend linearly from the charge air input to the charge air output.

Preferably the liquid coolant passages are at the inlet end of the charge air conduits and the air coolant passages are at the outlet end of the charge air conduits.

Preferably the plurality of charge air conduits includes at least four charge air conduits.

Optimally, the plurality of charge air conduits includes between fifteen and thirty charge air conduits, although this can be varied for a number of reasons particularly those related to performance and packaging requirements.

Preferably a header is provided to separate and seal the gas coolant passages from the liquid coolant passages.

Preferably the header comprises a plurality of apertures, through which the charge air conduits extend.

Preferably the charge air cooler comprises a liquid coolant inlet and a liquid coolant outlet, an air coolant inlet and an air coolant outlet.

Preferably a first sealing plate is provided between the liquid coolant inlet and the header to define a channel between the liquid coolant inlet and liquid coolant passages.

Preferably a second sealing plate is provided between the liquid coolant outlet and the header to define a channel between the liquid coolant outlet and liquid coolant passages.

The sealing plates may be attached to the header, by, for example, brazing or welding. Alternatively the sealing plates may be formed as a single piece with the header.

The invention provides an engine comprising an exhaust gas conduit which powers a turbocharger, the turbocharger being connected to a charge air cooler according to the first aspect of the present invention, and the charge air cooler connected to at least one cylinder.

According to a further aspect of the present invention, there is provided a charge air cooler comprising:
  a charge air inlet;
  a charge air outlet;
  a plurality of charge air conduits in communication with the charge air inlet and the charge air outlet;
  at least one liquid coolant passage;
  at least one air coolant passage;
  wherein the liquid coolant passage is arranged to cool at least one of the said plurality of charge air conduits;
  and the air coolant passage is arranged to cool the said at least one of the plurality of charge air conduits.

According to a further aspect of the present invention there is provided a pre-cooler for a charge air cooler, the pre-cooler comprising:
  a sealing plate which, in use, defines at least one liquid coolant passage;
  a header comprising a plurality of slots, each slot adapted to receive and seal therein a charge air tube of a charge air cooler;

wherein the pre-cooler is adapted to connect with the charge air cooler to form an integral charge air cooler and pre-cooler in accordance with the first aspect of the invention.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Figure 1:
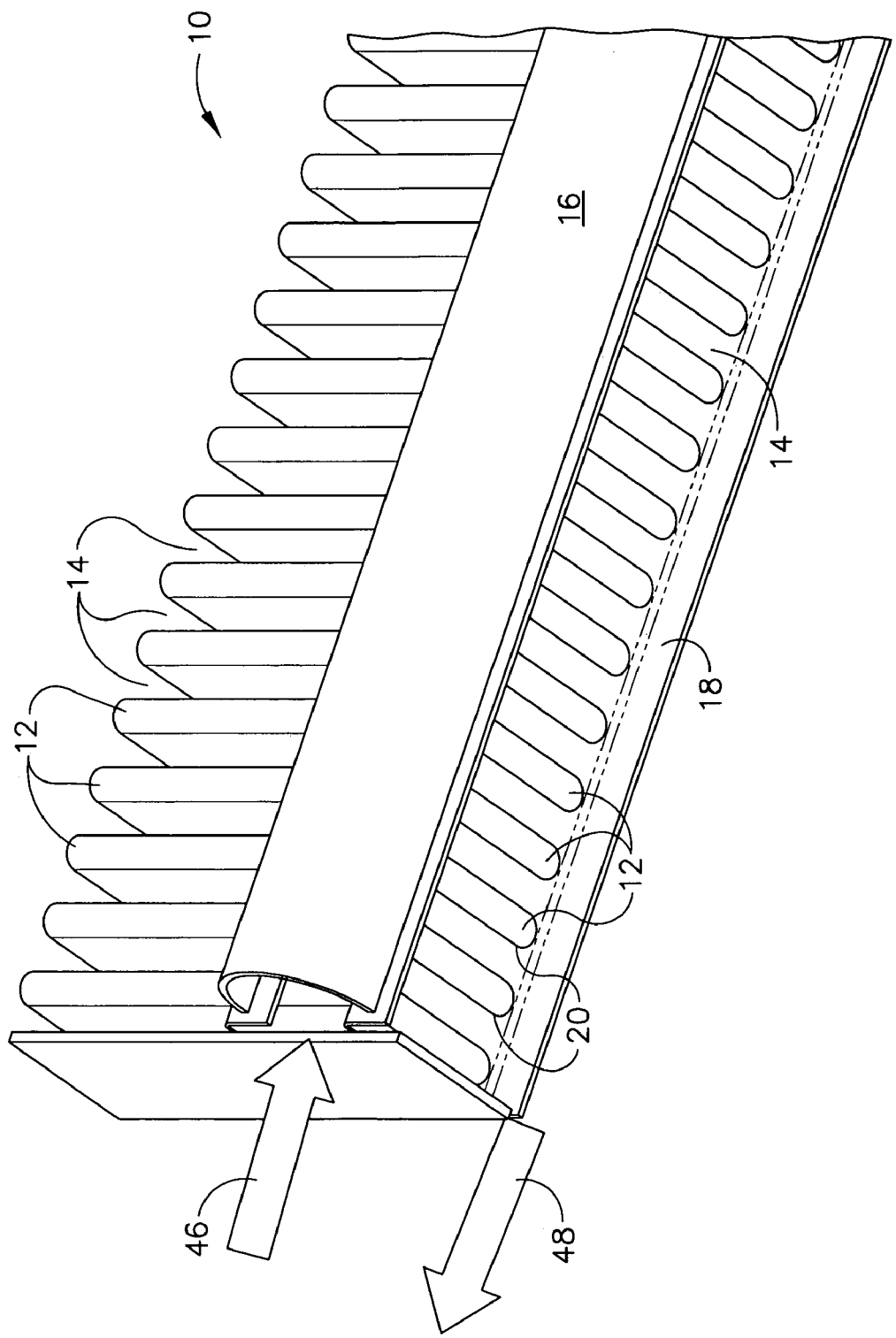
FIG. 1 is a perspective view of a first embodiment of the invention showing a charge air cooler (CAC) with integral pre-cooler; fins and an outlet header have been removed from the figure for clarity.

FIG. 1 shows a first embodiment of a charge air cooler (CAC) 10 in accordance with the present invention. The CAC 10 comprises a series of charge air tubes 12, cooling air channels 14 and cooling water channels 34 both between the charge air tubes 12, and a water tank 16 which extends over the charge air tubes 12.

Figure 2:
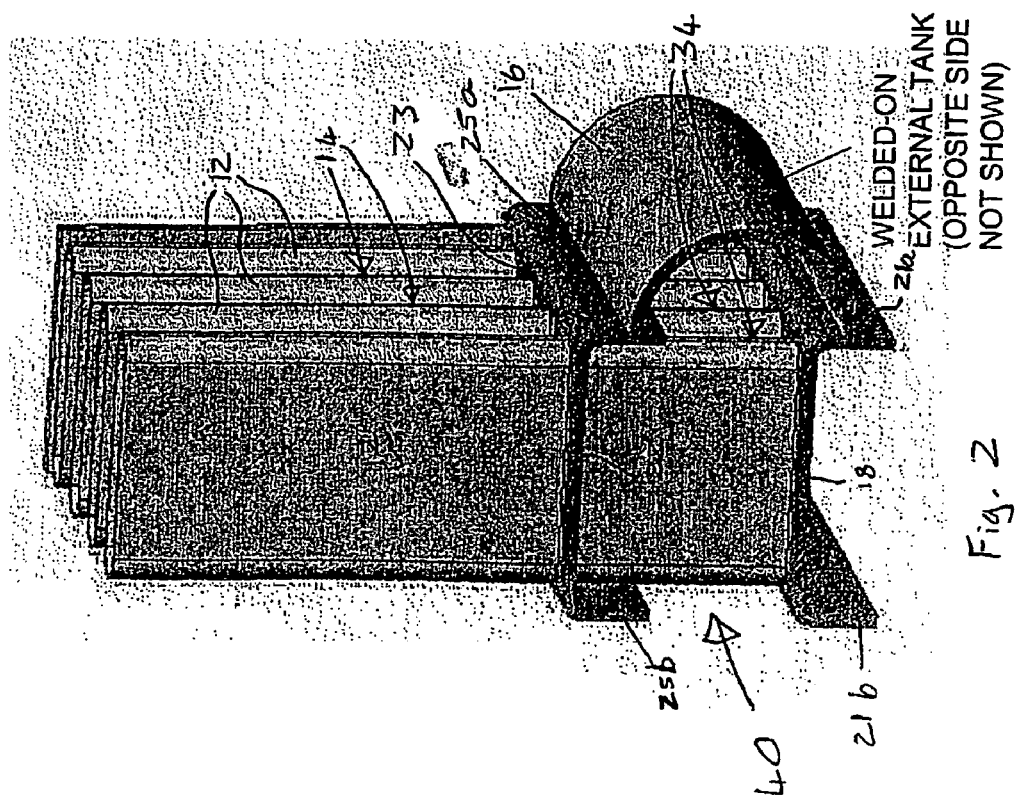
FIG. 2 is a second perspective view of the FIG. 1 CAC with integral pre-cooler; the fins and an opposite face of the pre-cooler have been removed from the figure for clarity.

As shown in FIG. 2, an inlet header 18 is provided at the inlet end of the charge air tubes 12. The inlet header is perpendicular to the charge air tubes 12 and comprises a main face 19 with a series of slots 20 (not shown in FIG. 2) which direct the charge air gas (to be cooled) through the charge air tubes 12 and prevent the charge air gas (to be cooled) from entering the channels 14, 34 between the tubes 12.

A second header 22 (not shown in FIG. 1) is provided parallel to and 2" to 3" from the first inlet header 18. The header 22 also includes a main face 23 with a number of corresponding slots 24—the charge air tubes 12 extend through and are sealed therein by these slots 24.

At opposite sides of the header 18 are connecting portions 21a, 21b. Similarly the header 22 has connecting portions 25a and 25b at opposite sides. Each connecting portion 21a, 21b, 25a, 25b extends perpendicular to the main face 19, 23 of the headers 18, 22. One water tank 16 is attached to the connecting portions 21a and 25a at one side of the headers 18, 22. A second water tank (not shown in FIG. 2) is attached to the connecting portions 21b, 25b at the opposite side from the first water tank 16. Thus an integral pre-cooler 40 is defined between the main faces 19, 23 of the headers 18, 22 and between the water tanks 16 on opposite sides of the charge air tubes 12. The cooling water channels 34 are defined between the charge air tubes 12 within said pre-cooler 40.

A water coolant inlet and outlet are connected to the water tanks 16 in any suitable configuration. For example, the water tanks 16 at either side of the charge air tubes 12 may be connected such that the water can flow in through the first water tank and can flow out through the second tank, as indicated by the arrows 46, 48 in FIG. 1. Alternatively, shown in FIG. 4b, an inlet 36 may be provided at one end the water cooler 16 and an outlet 38 at the opposite end of the same water cooler 16. The location of the coolant inlet 36 and outlet 38 are also partly dependant on the flow path of the coolant and the number (if any) of baffles used to direct the flow of coolant.

Figure 4B:
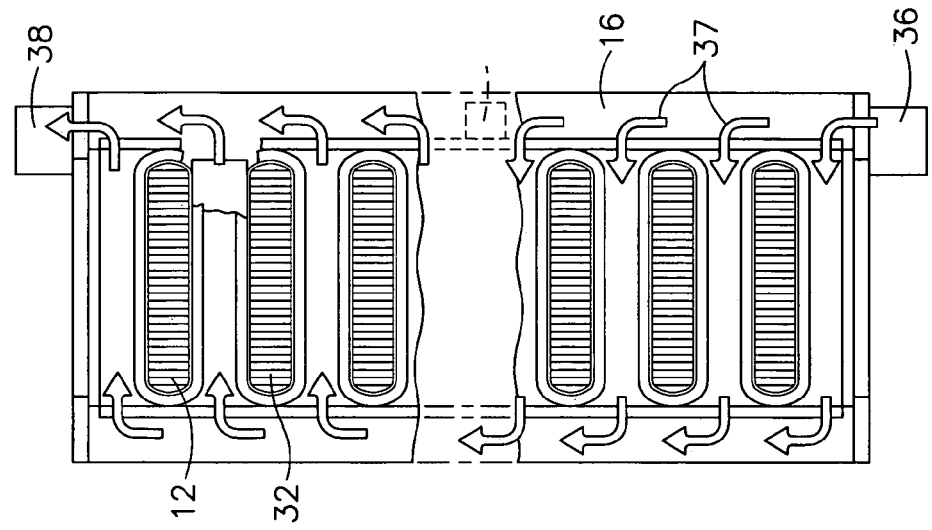
FIG. 4b is an end, partly cut away, view of the FIG. 1 CAC with integral pre-cooler.
Figure 4A:
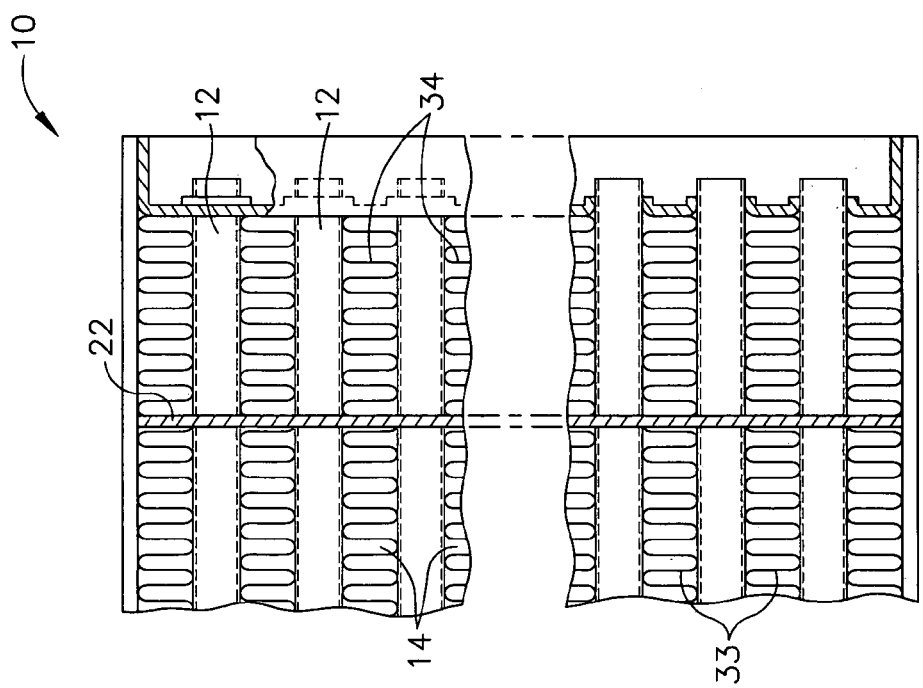
FIG. 4a is a side sectional view of the FIG. 1 CAC.
Figure 4C:
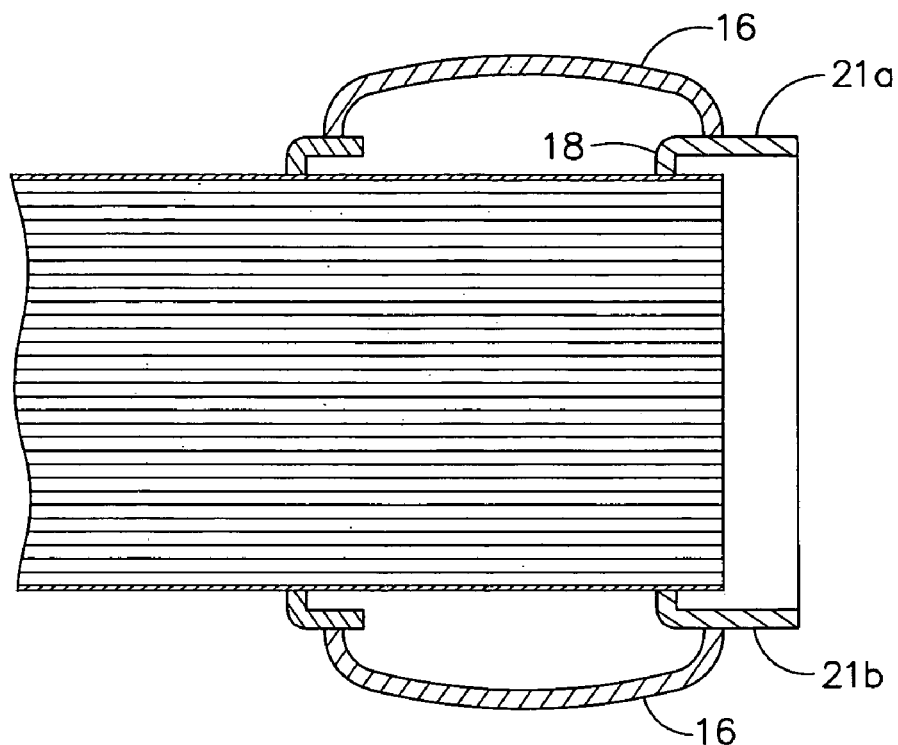
FIG. 4c is a top view of the FIG. 1 CAC cooler with integral pre-cooler.

As shown in FIG. 4b, the direction of coolant flow 37 through the water coolers 16 and the cooling water channels 34 is manipulated by the baffle 39. Further baffles may be provided to increase the number of passes of the coolant flow—such baffles can direct the coolant for two, three or more passes.

The water/coolant source may be engine jacket water or another coolant source such as a separate loop system (not shown).

Figure 6:
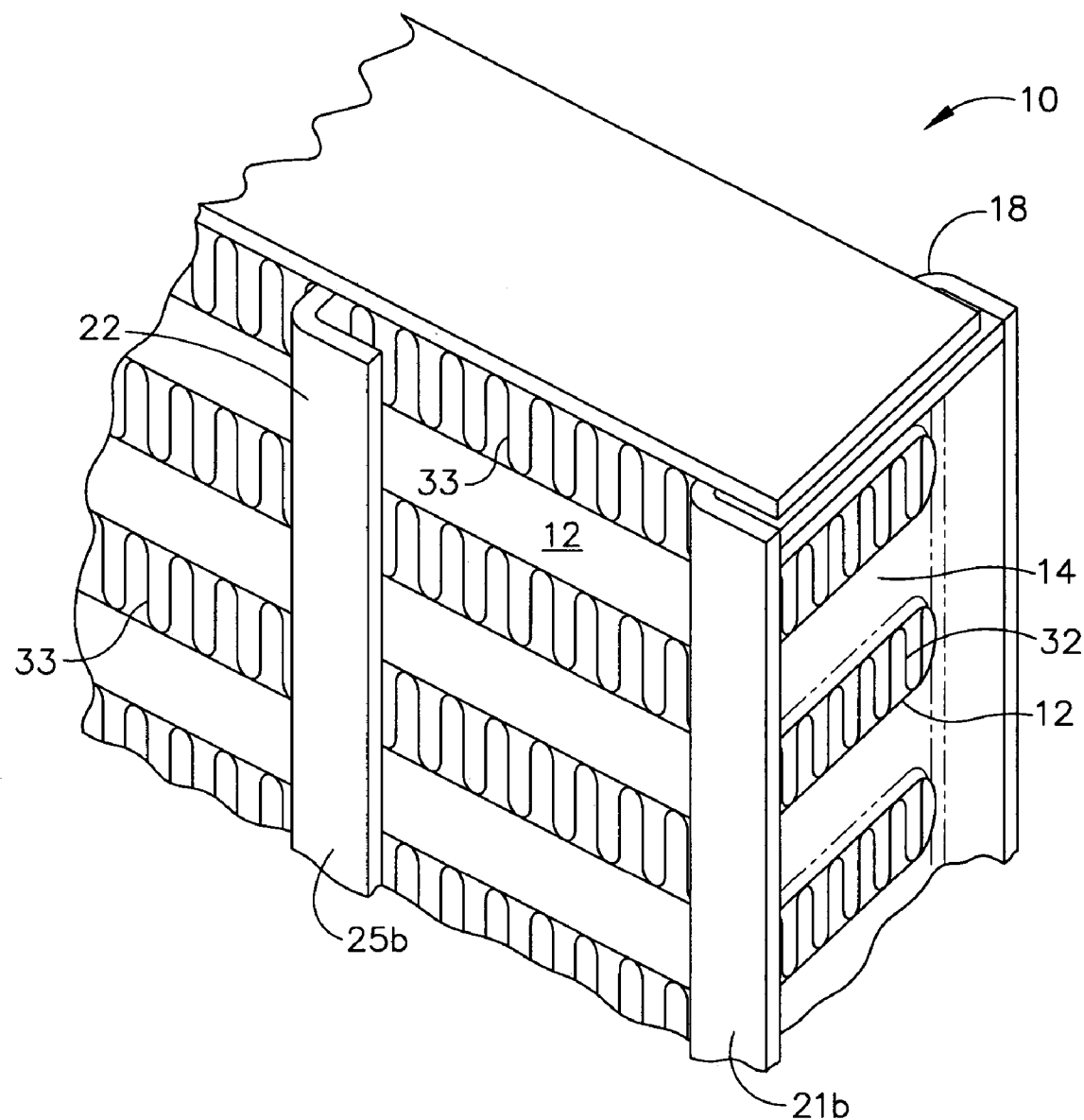
FIG. 6 is a perspective view of FIG. 1 embodiment of the CAC but with the pre-cooler coolant tanks omitted.

Fins 32 are provided within the charge air tubes 12 in order to aid heat exchange between the charge air tubes 12 and the cooling air channels 14 and cooling water channels 34. The fins 32 are shown in FIGS. 4b and 6 but have been omitted from FIGS. 1–3 for clarity. Cooling fins 33 may also be provided in the cooling air and water channels 14, 34. These fins are typically smaller in the cooling water channels 34 than the cooling air channels 14.

Figure 7:
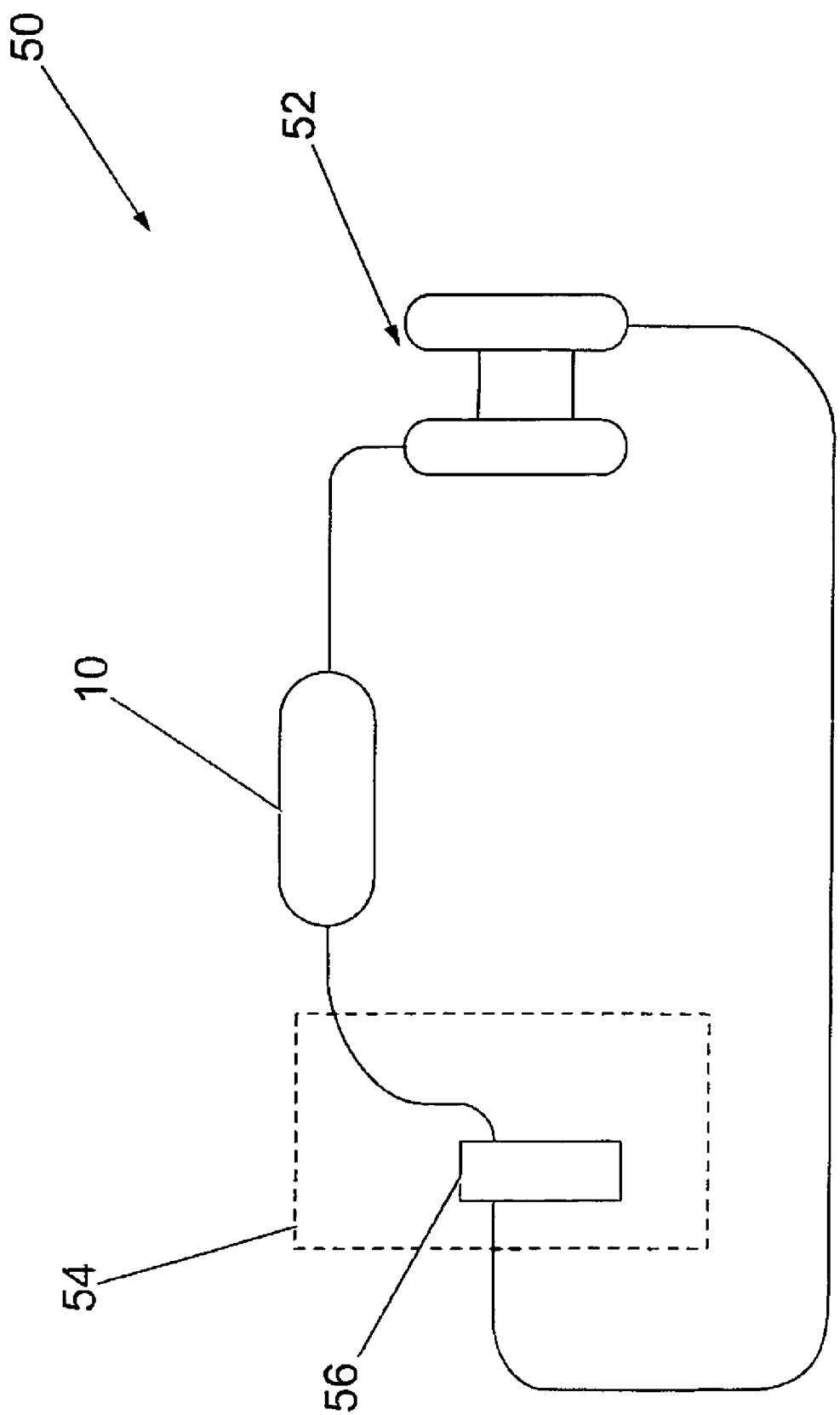
FIG. 7 is a diagrammatic view of an engine comprising a charge air cooler in accordance with the present invention.

As shown in FIG. 7, the charge air cooler 10 is provided in the engine loop 50 between a turbocharger 52 and an engine 54 comprising a cylinder 56.

In use, charge air to be cooled flows from the turbocharger through the charge air tubes 12. Water flows through the cooling water channels 34 and water tanks 16 and cooling air is directed through the cooling air channels 14.

Heat is exchanged between the charge air in the charge air tubes 12 and the water in the cooling water channels 34 and water tanks 16. Although the amount of heat exchanged will vary depending on a number of factors, preferred embodiments of the invention allow for the temperature of the charge air to be cooled by up to 100 F by the cooling water channels 34/water tanks 16. The cooled air loses more heat as it passes through the portion of the charge air tubes 12 past the header 18 and adjacent to the cooling air channels 14. The charge air then proceeds to the cylinders of the engine as is conventional.

Figure 3:
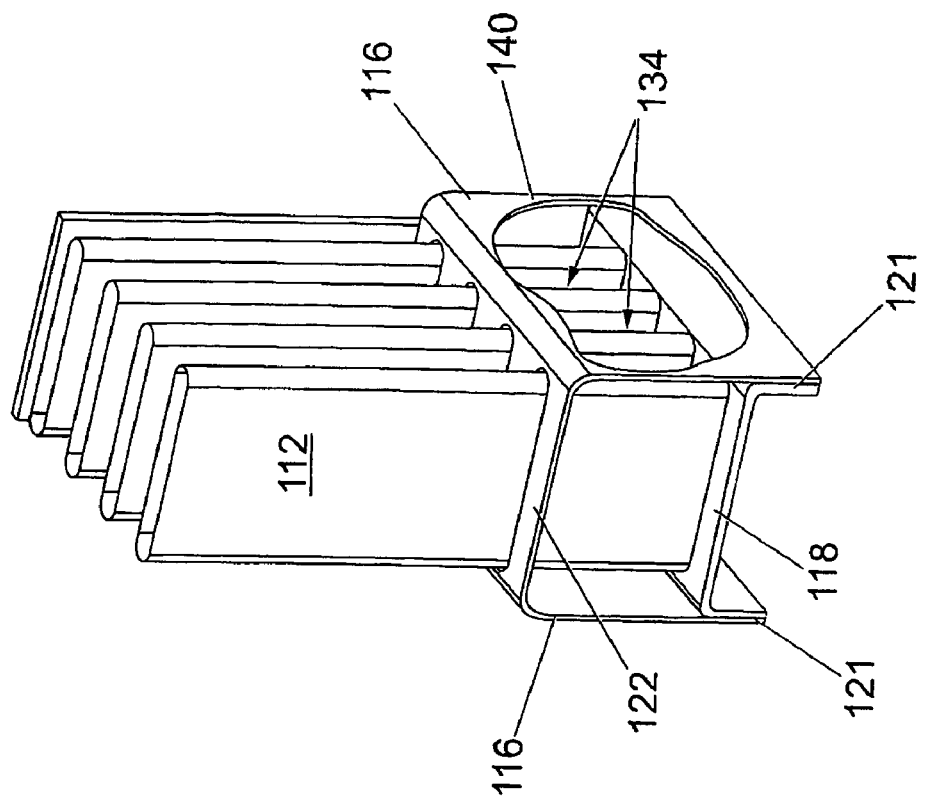
FIG. 3 is a perspective view of a second embodiment of a CAC with integral pre-cooler shown with a portion of its face cut-away for illustration purposes; the fins have been removed from the figure for clarity.
Figure 5:
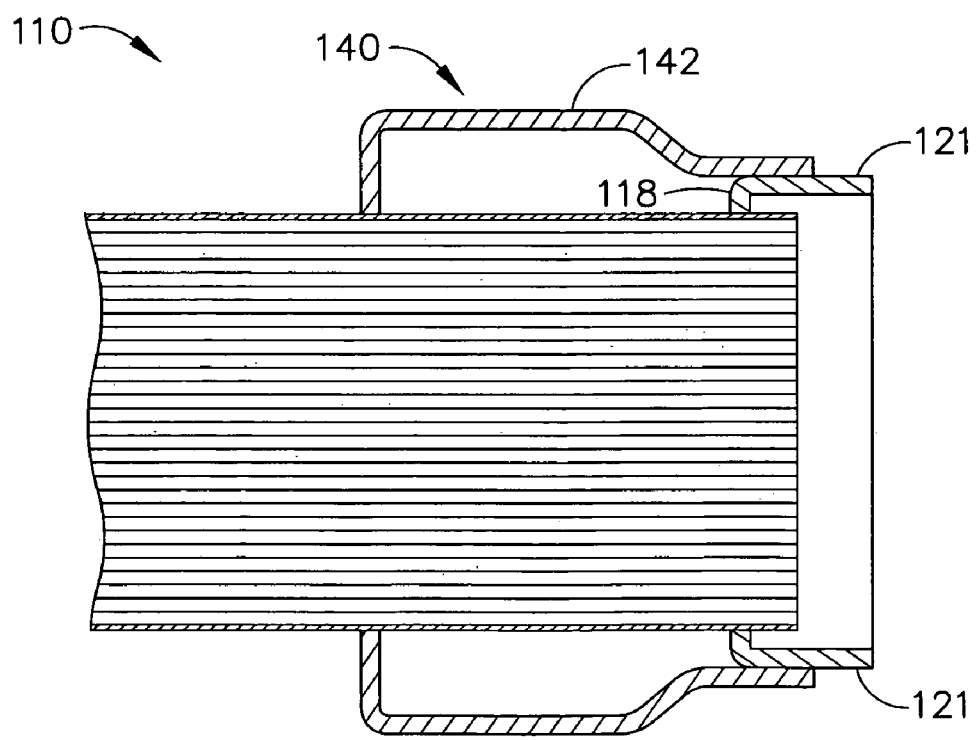
FIG. 5 is a top view of the FIG. 3 embodiment of the CAC cooler with integral pre-cooler.

A second embodiment 110 of the invention is shown in FIGS. 3 and 5. In this embodiment a second header 122 and water tanks 116 are provided as a single integrated deep-draw tank 142. This provides the benefit of fewer parts, making assembly more straightforward. The tank 142 is attached to connecting portions 121 of an inlet header 118 to define an integral pre-cooler 140. The charge air tubes 112, cooling water channels 134 and cooling air channels 114 are the same as the corresponding features of the first aspect of the invention.

The pre-cooler 140 serves essentially the same pre-cooling function as the pre-cooler 40 of the first embodiment of the invention: water coolant proceeds through one side of the tank 142, through cooling water channels 134 and out through an opposite end of the tank 142, or through the other side of the tank 142. The charge air to be cooled is thus pre-cooled by the flow of water in the adjacent channels 134.

It is noted that the pressure of the charge air to be cooled is not affected by the pre-coolers 40, 140. Thus there is no pressure loss in the charge air caused by the integral pre-coolers 40, 140. Embodiments of the invention benefit in that additional cooling is achieved without such an undesirable loss in pressure.

Due to the higher heat transfer coefficient of water (compared to air), the temperature of the CAC 10, 100 with precooler 40, 140 is reduced sufficiently to below its operational design limits. In contrast certain known charge air coolers which cool using air only and not liquid, heat up to a temperature above their design limits which results in a number of problems including premature aging. Alternatively known charge air coolers without pre-coolers can be utilized to provide a lower pressure boost (compared to embodiments of the present invention) in order to reduce the charge air temperature to an acceptable level and therefore stay within the design limitations. Thus such known charge air coolers do not benefit from the higher pressure boost.

Embodiments of the present invention also benefit in that the precooler may be added to conventional charge air/air coolers. Notably, no pressure drop will occur due to the addition of such an integral precooler because the charge air path through the tubes is not affected by the pre-cooler.

Embodiments of the invention are particularly suited for use in diesel engines.

Improvements and modifications may be made without departing from the scope of the invention.

We claim:

1. A charge air cooler comprising:
   a charge air inlet;
   a charge air outlet;
   a plurality of charge air conduits in communication with the charge air inlet and the charge air outlet;
   a plurality of primary liquid coolant passages;
   at least one air coolant passage;
   wherein the plurality of primary liquid coolant passages is arranged to cool at least one of the said plurality of charge air conduits;
   and the air coolant passage is arranged to cool the said at least one of the plurality of charge air conduits; the charge air cooler further comprising:
      a tank defining a secondary liquid coolant passage, the secondary liquid coolant passage being in fluid communication with the plurality of primary liquid coolant passages and being in a non-linear alignment with the plurality of primary liquid coolant passages;
   wherein the secondary liquid coolant passage is in contact with at least one charge air conduit.

2. A charge air cooler comprising:
   a charge air inlet;
   a charge air outlet;
   a plurality of charge air conduits in communication with the charge air inlet and the charge air outlet;
   a plurality of primary liquid coolant passage;
   at least one air coolant passage; wherein a first portion of at least one charge air conduit is disposed adjacent to the plurality of primary liquid coolant passages and a second portion of the said at least one charge air conduit is disposed adjacent to the air coolant passage; the charge air cooler further comprising:
      a tank defining a secondary liquid coolant passage, the secondary liquid coolant passage being in fluid communication with the plurality of primary liquid coolant passages and being in a non-linear alignment with the plurality of primary liquid coolant passages wherein the secondary liquid coolant passage is in contact with at least one charge air conduit.

3. A charge air cooler as claimed in claim 2, wherein a plurality of coolant passages is disposed between said charge air conduits and a portion of each coolant passage is an air coolant passage and a portion of each coolant passage is a liquid coolant passage.

4. A charge air cooler as claimed in claim 3, wherein the liquid coolant passages are at the inlet end of the charge air conduits and the air coolant passages are at the outlet end of the charge air conduits.

5. A charge air cooler as claimed in claim 2, wherein the charge air conduits extend linearly from the charge air input to the charge air output.

6. A charge air cooler as claimed in claim 2, wherein the plurality of charge air conduits includes at least four charge air conduits.

7. A charge air cooler as claimed in claim 2, further comprising:
   a header to separate and seal the gas coolant passage from the liquid coolant passage;
   a liquid coolant inlet;
   a liquid coolant outlet;
   said tank between the liquid coolant inlet and the header; and,
   a second tank between the liquid coolant outlet and the header.

8. A charge air cooler as claimed in claim 7, wherein the tanks are attached to the header by brazing or welding.

9. A charge air cooler as claimed in claim 7, wherein the tanks are formed as a single piece with the header.

10. A charge air cooler as claimed in claim 2, wherein the secondary liquid coolant passage is substantially perpendicular to the plurality of primary liquid coolant passages.

11. An engine comprising an exhaust gas conduit connected to a turbocharger, the turbocharger being connected to a charge air cooler according to claim 1, and said charge air cooler connected to at least one cylinder.

* * * * *